United States Patent
Saito et al.

(10) Patent No.: US 7,931,743 B2
(45) Date of Patent: Apr. 26, 2011

(54) YELLOW INK COMPOSITION, INK SET, RECORDING METHOD USING THEM, AND RECORD

(75) Inventors: Chie Saito, Matsumoto (JP); Miharu Kanaya, Azumino (JP); Kiyohiko Takemoto, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 178 days.

(21) Appl. No.: 12/322,079

(22) Filed: Jan. 29, 2009

(65) Prior Publication Data

US 2009/0196995 A1 Aug. 6, 2009

(30) Foreign Application Priority Data

Jan. 31, 2008 (JP) ................................. 2008-020175

(51) Int. Cl.
*C09D 11/02* (2006.01)
*B41J 2/01* (2006.01)

(52) U.S. Cl. ................. 106/31.6; 106/31.75; 106/31.86; 106/31.89; 347/100

(58) Field of Classification Search ............... 106/31.75, 106/31.86, 31.89, 31.6; 347/100
See application file for complete search history.

(56) References Cited

U.S. PATENT DOCUMENTS

| | | | | |
|---|---|---|---|---|
| 5,738,716 | A * | 4/1998 | Santilli et al. | 106/31.6 |
| 5,846,306 | A * | 12/1998 | Kubota et al. | 106/31.75 |
| 6,030,441 | A * | 2/2000 | Kubota et al. | 106/31.75 |
| 6,043,297 | A * | 3/2000 | Sano | 523/160 |
| 6,110,267 | A | 8/2000 | Winter et al. | |
| 6,284,029 | B1 * | 9/2001 | Sano et al. | 106/31.6 |
| 6,419,733 | B1 * | 7/2002 | Sano et al. | 106/31.86 |
| 6,562,117 | B2 | 5/2003 | Sano et al. | |
| 6,821,330 | B1 | 11/2004 | Sano et al. | |
| 6,869,470 | B2 | 3/2005 | Kato | |
| 6,924,327 | B2 | 8/2005 | Sano et al. | |
| 7,384,472 | B2 | 6/2008 | Schweikart et al. | |
| 7,670,418 | B2 | 3/2010 | Kato et al. | |
| 2002/0007765 | A1 | 1/2002 | Sano et al. | |
| 2002/0077384 | A1 | 6/2002 | Sano et al. | |
| 2007/0129457 | A1 | 6/2007 | Nakano et al. | |
| 2007/0215008 | A1 | 9/2007 | Schweikart et al. | |
| 2007/0224345 | A1 | 9/2007 | Metz et al. | |
| 2008/0173214 | A1 | 7/2008 | Oyanagi et al. | |
| 2008/0182085 | A1 | 7/2008 | Oyanagi et al. | |
| 2008/0207805 | A1 | 8/2008 | Blease et al. | |
| 2008/0233362 | A1 * | 9/2008 | Kato et al. | 106/31.6 |
| 2008/0308004 | A1 | 12/2008 | Deroover et al. | |
| 2009/0110827 | A1 | 4/2009 | Nakano et al. | |
| 2009/0142555 | A1 | 6/2009 | Sano et al. | |
| 2009/0181219 | A1 * | 7/2009 | Saito et al. | 106/31.86 |
| 2009/0196995 | A1 | 8/2009 | Saito et al. | |
| 2010/0062161 | A1 * | 3/2010 | Shiono et al. | 427/256 |

FOREIGN PATENT DOCUMENTS

| | | |
|---|---|---|
| JP | 09-151342 | 6/1997 |
| JP | 10-025440 | 1/1998 |
| JP | 10-120956 | 5/1998 |
| JP | 10-140065 | 5/1998 |
| JP | 11-043636 | 2/1999 |
| JP | 11-172180 | 6/1999 |
| JP | 11-209672 | 8/1999 |
| JP | 2000-345080 | 12/2000 |
| JP | 2001-247810 | 9/2001 |
| JP | 2005-015813 A | 1/2005 |

OTHER PUBLICATIONS

U.S. Appl. No. 12/321,050—Notice of Allowance mailed Jun. 1, 2010.
U.S. Appl. No. 12/321,050—Non-Final Rejection mailed Jun. 24, 2009.
U.S. Appl. No. 12/321,050—Final Rejection mailed Mar. 24, 2010.
U.S. Appl. No. 12/074,532—Notice of Allowance mailed Nov. 24, 2009.
U.S. Appl. No. 12/074,532—Non-Final Rejection mailed Jun. 24, 2009.
Abstract of WO 2007/060264, May 2007.

* cited by examiner

*Primary Examiner* — Helene Klemanski
(74) *Attorney, Agent, or Firm* — Nutter McClennen & Fish LLP; John J. Penny, Jr.; Michael P. Visconti, III

(57) ABSTRACT

A yellow ink composition includes C.I. Pigment Yellow and C.I. Pigment Yellow 74 as coloring agents. The ratio of a C.I. Pigment Yellow 185 content (percent by weight) to a C.I. Pigment Yellow 74 content (percent by weight) is in the range of 0.5 to 15. The yellow ink composition has a C.I. Pigment Yellow 185 content of 10% to 20% by weight and a C.I. Pigment Yellow 74 content of 10% to 20% by weight.

14 Claims, No Drawings

YELLOW INK COMPOSITION, INK SET, RECORDING METHOD USING THEM, AND RECORD

BACKGROUND

1. Technical Field

The present invention relates to a yellow ink composition, an ink set including a cyan ink composition, a yellow ink composition, and a magenta ink composition, which are used for an ink jet recording, and an ink jet recording method in which printing is performed by depositing a reaction solution and an ink composition to a recording medium.

2. Related Art

Ink jet recording is a printing method in which droplets of an ink composition are ejected and deposited onto a recording medium, such as paper, to conduct printing. A feature of this method is that an image having high resolution and high quality can be printed at a high speed with relatively inexpensive apparatuses.

In general, ink compositions for use in ink jet recording each contain water as a main component, a coloring agent, and a wetting agent, such as glycerol, for preventing clogging. Water-soluble dyes are often used as coloring agents used in ink compositions for ink jet recording because of their high saturation, the wide variety of types of coloring agents available, their good water solubility, and the like.

Dye, however, may have poor properties such as low water resistance and lightfastness. Thus, materials printed with dye ink compositions may have poor water resistance and lightfastness. Use of specialized ink-jet paper having an ink-absorbing layer results in improvement in water resistance. In the case of using plain paper, however, materials printed with dye ink compositions have insufficient water resistance.

Pigments have water resistance and lightfastness superior to dyes. To improve water resistance and lightfastness, the use of pigments as coloring agents used in ink compositions for ink jet recording has recently been examined. Pigments are generally insoluble in water. To use pigments in aqueous ink compositions, it is thus necessary to stably disperse pigments in water and then prepare ink compositions including the pigments. Examples of an aqueous pigment ink include an aqueous pigment ink containing a pigment dispersed by a surfactant or a polymeric dispersant, an aqueous pigment ink containing self-dispersible pigment particles having water-dispersible functional groups on surfaces of the particles, and an aqueous pigment ink containing colored fine particles in which pigment particles are covered with a water-dispersible resin.

When consideration is given to the use of pigments as coloring agents in inks for ink jet recording, although pigments have water resistance and lightfastness superior to dyes, the number of types of available coloring agents is smaller than that of dyes. In the case of practically using pigments as coloring agents in inks for ink jet recording, hues also need to be sufficiently investigated in addition to lightfastness and water resistance. For example, JP-A-2000-345080 discloses a yellow ink composition having a combination of a specific pigment having excellent lightfastness and two specific pigments having excellent color developability. JP-A-10-120956 discloses that the use of an ink set having a combination of cyan, magenta, and yellow ink compositions containing specific pigments results in a good image, in particular, an image having a good hue, lightfastness, and water resistance.

SUMMARY

The inventors have found that in a color ink jet recording method, the use of a yellow ink composition containing a specific pigment and an ink set including a magenta ink composition, a cyan ink composition, and a yellow ink composition containing a specific pigment provides a good image, in particular, an image having a satisfactory hue and lightfastness and provides a record having compatibility between satisfactory vividness and density even in the case of high-speed single-pass printing. These findings invention have led to the completion of the invention.

An advantage of some aspects of the invention is that it provides an ink composition and an ink set for use in ink jet recording, in which the use of the ink composition and the ink set provides a good image, in particular, an image having a satisfactory hue and lightfastness and provides a record having compatibility between satisfactory vividness and density even in the case of high-speed single-pass printing, and in which the ink composition and the ink set have satisfactory storage stability.

A yellow ink composition according to an aspect of the invention contains C.I. Pigment Yellow 185 and C.I. Pigment Yellow 74 as coloring agents. The ratio of a C.I. Pigment Yellow 185 content (percent by weight) to a C.I. Pigment Yellow 74 content (percent by weight) is in the range of 0.5 to 15. The yellow ink composition has a C.I. Pigment Yellow 185 content of 10% to 20% by weight and a C.I. Pigment Yellow 74 content of 10% to 20% by weight.

An ink set for use in ink jet recording according to another aspect of the invention includes a cyan ink composition, a magenta ink composition, and a yellow ink composition. The cyan ink composition contains at least one pigment selected from the group consisting of C.I. Pigment Blue 15:3 and C.I. Pigment Blue 15:4 as a coloring agent. The magenta ink composition contains at least one pigment selected from the group consisting of C.I. Pigment Red 122, C.I. Pigment Red 202, C.I. Pigment Red 209, and C.I. Pigment Violet 19 as a coloring agent. The yellow ink composition contains C.I. Pigment Yellow 185 and C.I. Pigment Yellow 74 as coloring agents. The ratio of a C.I. Pigment Yellow 185 content (percent by weight) to a C.I. Pigment Yellow 74 content (percent by weight) is in the range of 0.5 to 15. Each of the ink compositions has a pigment content of 10% to 20% by weight.

An ink jet recording method according to another aspect of the invention includes ejecting droplets of an ink composition and depositing the droplets onto a recording medium to perform printing. The yellow ink composition or the ink set described above is used.

In accordance with an embodiment of the invention, there is provided a yellow ink composition and an ink set, in which the use of the yellow ink composition and the ink set provides a good image, in particular, an image having a satisfactory hue and lightfastness and provides a record having compatibility between satisfactory vividness and density even in the case of high-speed single-pass printing, and in which the yellow ink composition and the ink set have satisfactory storage stability.

DESCRIPTION OF EXEMPLARY EMBODIMENTS

A yellow ink composition according to an embodiment of the invention contains C.I. Pigment Yellow 185 and C.I. Pigment Yellow 74 as coloring agents. The ratio of a C.I. Pigment Yellow 185 content (percent by weight) to a C.I. Pigment Yellow 74 content (percent by weight) is in the range of 0.5 to 15. The yellow ink composition has a C.I. Pigment Yellow 185 content of 10% to 20% by weight and a C.I. Pigment Yellow 74 content of 10% to 20% by weight.

An ink set according to another embodiment of the invention includes a cyan ink composition, a magenta ink composition, and a yellow ink composition. Each of the ink compositions contains a specific pigment as a coloring agent. The yellow ink composition and each of the ink compositions constituting the ink set according to the embodiments of the invention will be described below.

Yellow Ink Composition

The yellow ink composition and the yellow ink composition used for the ink set according to the embodiments of the invention each contain C.I. Pigment Yellow 185 and C.I. Pigment Yellow 74 as coloring agents. The ratio of a C.I. Pigment Yellow 185 content (percent by weight) to a C.I. Pigment Yellow 74 content (percent by weight) is in the range of 0.5 to 15. The yellow ink composition has a C.I. Pigment Yellow 185 content of 10% to 20% by weight and a C.I. Pigment Yellow 74 content of 10% to 20% by weight. Thus, it is possible to provide a good image, in particular, an image having a satisfactory hue and lightfastness and to provide a record having compatibility between satisfactory vividness and density even in the case of high-speed single-pass printing. The term "high-speed single-pass printing" indicates a method for recording one dot line in one main scan operation, i.e., single pass. This method can achieve high-speed printing. Examples of an ink jet printer with which printing is performed by the recording method include "a serial printer" which includes a recording head, a head-scanning mechanism that transfers the recording head in a main scanning direction, and a carriage that feeds a recording medium such as recording paper in a feed direction to perform a sub-scanning and which repeatedly perform the main scanning of the recording head and the sub-scanning of the paper feed to perform recording on the recording medium; and "a line-head ink jet printer" which includes a long recording head having the same length as the width of a recording medium and which performs recording without the need to scan the recording head.

In the case where the yellow ink composition containing these yellow pigments is used in combination with a magenta ink composition and a cyan ink composition described below, in which the ratio of a C.I. Pigment Yellow 185 content (percent by weight) to a C.I. Pigment Yellow 74 content (percent by weight) is in the range of 0.5 to 15 and preferably 4 to 15 and in which the yellow ink composition has a C.I. Pigment Yellow 185 content of 10% to 20% by weight and a C.I. Pigment Yellow 74 content of 10% to 20% by weight, a good image, in particular, an image having a satisfactory hue and lightfastness can be obtained. Furthermore, a record having compatibility between satisfactory vividness and density can be obtained even in the case of high-speed single-pass printing.

The pigment ink composition for use in ink jet recording according to an embodiment of the invention may be a self-dispersible pigment ink containing water and a pigment that can be dispersed in water without using a dispersant or may be a pigment ink containing a pigment dispersible in water with a resin.

In accordance with an embodiment of the invention, the self-dispersible pigment ink preferably contains pigment particles having many hydrophilic functional groups and/or salts thereof directly connected to surfaces of the pigment particles or indirectly connected to surfaces of the pigment particles with multivalent groups or the like, the pigment particles being dispersible and/or soluble in an aqueous medium in the absence of a dispersant. Specifically, such pigment particles can be made by performing physical treatment, such as vacuum plasma treatment, or chemical treatment using an oxidant, e.g., sodium hypochlorite or ozone, to graft functional groups or molecules having functional groups on the surfaces of the pigment particles. In accordance with an embodiment of the invention, the same or different types of functional groups may be grafted on one pigment particle. The type of functional group grafted and the degree of grafting may be appropriately determined in view of dispersion stability in ink, color density, drying properties in an area in front of an ink jet head, and the like.

In accordance with an embodiment of the invention, a preferred method for dispersing a coloring agent with a dispersion resin includes dissolving or dispersing an anionic group-containing polymer in alkaline water containing an alkaline compound, e.g., an organic amine or an alkali metal compound, mixing the resulting mixture and a coloring agent, and dispersing the coloring agent with a disperser, such as a ball mill, sand mill, an attritor, a roll mill, an agitator mill, a Henschel mixer, a colloid mill, an ultrasonic homogenizer, a jet mill, or an angmill. To more firmly bond the coloring agent to the dispersion polymer to stabilize the resulting dispersion, more preferably, methods disclosed in JP-A-9-151342, JP-A-10-140065, JP-A-11-209672, JP-A-11-172180, JP-A-10-25440, JP-A-11-43636, and JP-A-2001-247810 may be employed. These methods disclosed in these Patent Documents will be outlined below.

JP-A-2001-247810, JP-A-9-151342, and JP-A-10-140065 disclose "a phase inversion method" and "an acidification method".

In accordance with an embodiment of the invention, the phase inversion method fundamentally indicates a method for dispersing a self-dispersible or soluble mixture of a polymer and a pigment in water. This method is also referred to as a "self-dispersion method (phase inversion emulsification". The mixture may have a state in which the pigment does not dissolve in the polymer but is mixed with the polymer, a state in which the pigment dissolves in the polymer, or both. An exemplary method for preparing a polymer particle colorant dispersion containing pigment particles enclosed with a water-dispersible polymer includes the steps of (1) adding a pigment, a neutralizer, and a small amount of water to a solvent solution of a dispersion resin precursor (e.g., the foregoing anionic group-containing polymer) to prepare a solvent-based slurry, (2) dispersing the slurry in a large amount of water to prepare a water-based slurry, (3) removing the solvent used for dissolving the polymer from the water-based slurry.

In accordance with an embodiment of the invention, the acidification method indicates a method for producing a coloring agent by preparing a water-containing cake composed of a polymer and a pigment and partially neutralizing unneutralized groups of the polymer in the cake with a neutralizer. In the case where the unneutralized groups are anionic acid groups and where the neutralizer is a basic compound, specifically, for example, the method includes the steps of (1) dispersing a polymer and a pigment in an aqueous alkaline medium and, as needed, performing heat treatment to gelatinize the polymer, (2) neutralizing or acidifying the medium to impart hydrophobicity to the polymer, so that the polymer is firmly bonded to the pigment, (3) performing filtration and washing, as needed, to afford a water-containing cake, (4) partially or entirely neutralizing the anionic groups of the polymer with the basic compound and then redispersing the resulting cake in an aqueous medium, and (5) performing heat treatment, as needed, to gelatinize the polymer.

More details about the phase conversion method and the acidification method may be the same as methods disclosed in JP-A-9-151342 and JP-A-10-140065.

JP-A-11-209672 and JP-A-11-172180 disclose a method for producing a coloring agent. This method fundamentally includes the steps of (1) mixing an anionic group-containing polymer or an organic solvent solution of an anionic group-containing polymer with a basic compound to perform neutralization, (2) mixing the resulting mixture with a pigment and then dispersing the pigment with a disperser or the like to form a pigment suspension, (3) removing the solvent, as needed, (4) adding an acidic compound to precipitate the anionic group-containing polymer, so that particles of the pigment are covered with the anionic group-containing polymer, (5) performing filtration and washing with water, as needed, and (6) neutralizing the anionic groups of the anionic group-containing polymer by the addition of a basic compound and dispersing the polymer in an aqueous medium to afford an aqueous colorant dispersion.

In the case where a coloring agent according to an embodiment of the invention is a pigment, the ink may further contain a resin emulsion. The addition of the emulsion improves the abrasion resistance and fixing properties of a print. In this emulsion, preferably, its continuous phase is composed of water, and its disperse phase is composed of an acrylic resin, a methacrylic resin, a styrene resin, a urethane resin, an acrylamide resin, an epoxy resin, or a mixture thereof. Particularly preferably, the disperse phase is composed of a resin mainly composed of acrylic acid and/or methacrylic acid. These resins may be prepared by any copolymerization process. For example, block copolymers and random copolymers may be used. Furthermore, the emulsion according to an embodiment of the invention has the ability to form a film and preferably has a minimum film forming temperature equal to or lower than room temperature.

A yellow ink composition according to an embodiment of the invention preferably contains water, a water-soluble organic compound, a pH adjuster, and a nonionic surfactant.

Water contained in the yellow ink composition according to an embodiment of the invention serves as a main solvent. Pure water or ultrapure water, e.g., ion exchanged water, ultrafiltration water, reverse osmosis-purified water, or distilled water, is preferably used. In particular, water sterilized by ultraviolet irradiation or addition of hydrogen peroxide is preferably used because the growth of molds and bacteria is prevented and the ink composition can be stored for long periods of time.

Examples of the water-soluble organic compound according to an embodiment of the invention include polyhydric alcohols, such as glycerol, 1,2,6-hexanetriol, trimethylolpropane, ethylene glycol, propylene glycol, diethylene glycol, triethylene glycol, tetraethylene glycol, pentamethylene glycol, dipropylene glycol, 2-butene-1,4-diol, 2-ethyl-1,3-hexanediol, 2-methyl-2,4-pentanediol, 1,2-octanediol, 1,2-hexanediol, 1,2-pentanediol, 1,5-pentanediol, and 4-methyl-1,2-pentanediol; saccharides, such as glucose, mannose, fructose, ribose, xylose, arabinose, galactose, aldonic acid, glucitol (sorbitol), maltose, cellobiose, lactose, sucrose, trehalose, and maltotriose; sugar alcohols; hyaluronic acids; solid humectants, such as trimethylolethane, trimethylolpropane, urea, and urea derivatives (e.g., dimethylurea); alkyl alcohols having 1 to 4 carbon atoms, such as ethanol, methanol, butanol, propanol, and 2-propanol; glycol ethers, such as ethylene glycol monomethyl ether, ethylene glycol monoethyl ether, ethylene glycol monobutyl ether, ethylene glycol monomethyl ether acetate, diethylene glycol monomethyl ether, diethylene glycol monoethyl ether, diethylene glycol mono-n-propyl ether, ethylene glycol mono-isopropyl ether, diethylene glycol mono-isopropyl ether, ethylene glycol mono-n-butyl ether, ethylene glycol mono-tert-butyl ether, diethylene glycol mono-tert-butyl ether, triethylene glycol monobutyl ether, 1-methyl-1-methoxybutanol, propylene glycol monomethyl ether, propylene glycol monoethyl ether, propylene glycol mono-tert-butyl ether, propylene glycol mono-n-propyl ether, propylene glycol mono-isopropyl ether, dipropylene glycol monomethyl ether, dipropylene glycol monoethyl ether, dipropylene glycol mono-n-propyl ether, and dipropylene glycol mono-isopropyl ether; 2-pyrrolidone and N-methyl-2-pyrrolidone; 1,3-dimethyl-2-2-imidazolidinone; formamide and acetamide; dimethyl sulfoxide; sorbitol and sorbitan; acetin, diacetin, and triacetin; and sulfolane. These compounds may be used alone or in combination. The ink composition preferably has a water-soluble organic solvent content of 10% to 50% by weight from the viewpoint of achieving appropriate physical properties (e.g., viscosity) of the ink composition, print quality, and reliability.

In this embodiment, when at least a polyhydric alcohol, a solid humectant, and butyl ether of glycol are used together as a water-soluble organic solvent, an ink composition having excellent print quality, ejection stability, and reliability such as recoverability from clogging can be provided. The polyhydric alcohol and the solid humectant serve to appropriately control water retentivity (moisture retention) and permeability of the ink composition to a recording medium such as plain paper. Butyl ether of glycol serves to appropriately control the ejection stability and permeability of the ink composition to the recording medium. Thus, the combination of these compounds provides the ink composition having excellent print quality, ejection stability, and reliability such as recoverability from clogging.

As a particularly preferable example of the water-soluble organic compound, a combination of at least two compounds selected from glycerol, diethylene glycol, triethylene glycol, 1,5-pentanediol, and 1,2-hexanediol is used as the polyhydric alcohol. The solid humectant is selected from trimethylolethane, trimethylolpropane, and urea. The butyl glycol is selected from diethylene glycol monobutyl ether and triethylene glycol monobutyl ether.

The yellow ink composition according to an embodiment of the invention preferably contains a pH adjuster. Examples of the pH adjuster that can be used include alkali hydroxides, such as lithium hydroxide, potassium hydroxide, and sodium hydroxide; ammonia; and alkanolamines, such as triethanolamine, tripropanolamine, diethanolamine, and monoethanolamine. In particular, preferably, the yellow ink composition contains at least one pH adjuster selected from an alkali metal hydroxide, ammonia, triethanolamine, and tripropanolamine and has a pH of 6 to 10. A pH outside this range adversely affects materials constituting an ink jet printer, reducing the recoverability from clogging.

In addition, for example, collidine, imidazole, phosphoric acid, 3-(N-morpholino)propanesulfonic acid, tris(hydroxymethyl)aminomethane, or boric acid may be used as a pH buffer, as needed.

Trialkanolamine used in this embodiment can also suitably serve as a gloss-imparting agent for the ink composition. To form an image having uniform gloss on a glossy recording medium, the gloss-imparting agent is incorporated in the ink composition.

In the case where trialkanolamine is used as the gloss-imparting agent for the ink composition, a trialkanolamine content is preferably in the range of 10% to 50% by weight and more preferably 12% to 45% by weight with respect to 100% by weight of the foregoing pigment from the viewpoint of erosion of members constituting a printer, ink viscosity, and glossiness. Furthermore, a trialkanolamine content is preferably 1% by weight or more and more preferably 1% to 3% by weight with respect to the total amount of the ink composition.

Trialkanolamine used as the gloss-imparting agent for the yellow ink composition is not particularly limited. Triethanolamine and/or tripropanolamine is preferred from the viewpoint of achieving good printing stability and glossiness.

The yellow ink composition may further contain a surfactant, an antifoamer, an antioxidant, an ultraviolet absorber, a preservative, a fungicide, and the like, as needed.

An anionic surfactant, a cationic surfactant, an amphoteric surfactant, or a nonionic surfactant may be incorporated as a surfactant. A nonionic surfactant is particularly preferred from the viewpoint of obtaining a low-foaming ink composition.

Examples of the nonionic surfactant include acetylenic glycol surfactants; acetylenic alcohol surfactants; ether surfactants, such as polyoxyethylene nonylphenyl ether, polyoxyethylene octylphenyl ether, polyoxyethylene dodecylphenyl ether, polyoxyethylene alkylallyl ether, polyoxyethylene oleyl ether, polyoxyethylene lauryl ether, polyoxyethylene alkyl ether, and polyoxyalkylene alkyl ether; ester surfactants, such as polyoxyethylene oleic acid, polyoxyethylene oleate, polyoxyethylene distearate, sorbitan laurate, sorbitan monostearate, sorbitan monooleate, sorbitan sesquioleate, polyoxyethylene monooleate, and polyoxyethylene stearate; polyether-modified siloxane surfactants such as polydimethylsiloxane; and fluorine-containing surfactants such as fluorinated alkyl esters and perfluoroalkyl carboxylate. These nonionic surfactants may be used alone or in combination.

Among these nonionic surfactants, in particular, acetylenic glycol surfactants and/or polyether-modified siloxane surfactants are preferred because of low foaming and excellent defoaming properties.

Examples of acetylenic glycol surfactants include 2,4,7,9-tetramethyl-5-decyne-4,7-diol, 3,6-dimethyl-4-octyne-3,6-diol, and 3,5-dimethyl-1-hexyn-3-ol. Commercially available examples thereof include Surfynol 104, Surfynol 82, Surfynol 465, Surfynol 485, and Surfynol TG (manufactured by Air Products and Chemicals Inc.); and Olfine STG and Olfine E1010 (manufactured by Nissin Chemical Industry Co., Ltd). Specific examples of polyether-modified siloxane surfactants include BYK-345, BYK-346, BYK-347, BYK-348, and UV 3530 (manufactured by BYK Japan KK). Different types of these surfactants may be used in the ink composition. The surface tension of the ink composition is preferably adjusted to 20 to 40 mN/m. The ink composition has a surfactant content of 0.1% to 3.0% by weight.

Examples of the antioxidant and the ultraviolet absorber include allophanates, such as allophanate and methyl allophanate; biurets, such as dimethylbiuret and tetramethylbiuret; L-ascorbic acid and salts thereof; Tinuvin 328, Tinuvin 900, Tinuvin 1130, Tinuvin 384, Tinuvin 292, Tinuvin 123, Tinuvin 144, Tinuvin 622, Tinuvin 770, Tinuvin 292, Irgacor 252, Irgacor 153, Irganox 1010, Irganox 1070, Irganox 1035, and MD 1024 (manufactured by Ciba-Geigy); and oxides of lanthanides.

Examples of the preservative and the fungicide include sodium benzoate, sodium pentachlorophenolate, sodium 2-pyridinethiol-1-oxide, sodium sorbate, sodium dehydroacetate, and 1,2-dibenzisothiazolin-3-one (Proxel CRL, Proxel BDN, Proxel GXL, Proxel XL-2, and Proxel TN (manufactured by Avecia Biologics Ltd)).

Magenta Ink Composition

A magenta ink composition for use in an ink set according to an embodiment of the invention contains at least one pigment selected from the group consisting of C.I. Pigment Red 122, C.I. Pigment Red 202, C.I. Pigment Red 209, and C.I. Pigment Violet 19 as a coloring agent. In the case where the magenta ink composition containing the specific magenta pigment is used in combination with the foregoing yellow ink composition and a cyan ink composition described below and where each of the ink compositions has a pigment content of 10% to 20% by weight, a good image, in particular, an image having a satisfactory hue and lightfastness can be provided. Furthermore, a record having compatibility between satisfactory vividness and density even in the case of high-speed single-pass printing can be obtained.

Like the yellow ink composition, the magenta ink composition may be a self-dispersible pigment ink containing water and a pigment that can be dispersed in water without using a dispersant or may be a pigment ink containing a pigment dispersible in water with a resin.

Like the yellow ink composition, a magenta ink composition according to an embodiment of the invention preferably contains water, a water-soluble organic compound, a pH adjuster, and a nonionic surfactant. Specific examples and the amount added may be the same as in the case of the yellow ink composition.

Cyan Ink Composition

A cyan ink composition for use in an ink set according to an embodiment of the invention contains at least one pigment selected from the group consisting of C.I. Pigment Blue 15:3 and C.I. Pigment Blue 15:4 as a coloring agent. In the case where the cyan ink composition containing the specific cyan pigment is used in combination with the foregoing yellow ink composition and magenta ink composition and where each of the ink compositions has a pigment content of 10% to 20% by weight, a good image, in particular, an image having a satisfactory hue and lightfastness can be provided. Furthermore, a record having compatibility between satisfactory vividness and density even in the case of high-speed single-pass printing can be obtained.

Like the yellow ink composition, the cyan ink composition may be a self-dispersible pigment ink containing water and a pigment that can be dispersed in water without using a dispersant or may be a pigment ink containing a pigment dispersible in water with a resin.

Like the yellow ink composition, a cyan ink composition preferably contains water, a water-soluble organic compound, a pH adjuster, and a nonionic surfactant. Specific examples and the amount added may be the same as in the case of the yellow ink composition.

Ink Set

An ink set according to an embodiment of the invention includes the foregoing ink compositions.

An ink set according to an embodiment of the invention may be a color recording ink set including additional ink compositions in addition to the foregoing ink compositions. Any type of additional ink compositions may be used as long as advantages of the ink set according to an embodiment of the invention are not impaired. Ink compositions commonly used for ink jet recording may be used.

Examples of the additional color ink compositions that can be included in the ink set include light cyan, light magenta, dark yellow, red, green, blue, orange, and violet. The light magenta and light cyan ink compositions generally indicate a magenta ink composition having a reduced colorant content and a cyan ink composition having a reduced colorant content, respectively, these light ink compositions being used to improve the quality of a printed image by density modulation. The dark yellow ink composition indicates a yellow ink composition containing a colorant (pigment) having lightness and saturation lower than those of the foregoing yellow ink composition, the dark yellow ink composition being used to improve the color reproducibility of dark color in shadow portions and the like. The red, orange, green, blue, and violet ink compositions are used as factors constituting intermediate colors between yellow, magenta, and cyan in order to improve a color reproduction range.

The ink set according to an embodiment of the invention can be made in the same way as known ink sets and can be used for various known recording methods. In particular, the ink set according to an embodiment of the invention is suitable for ink jet recording, in which ink droplets are ejected and deposited onto a recording medium such as paper to conduct printing, from the viewpoint that a high-resolution, high-quality image can be rapidly printed with a relatively inexpensive apparatus.

Ink Jet Recording Method

An ink jet recording method using an yellow ink composition or an ink set according to an embodiment of the invention includes ejecting droplets of the ink composition and depositing the droplets onto a heated recording medium to perform printing. Examples of a method for ejecting droplets of an ink composition include a method in which electrical signals are converted by an electrostrictive element into mechanical signals and an ink stored in a nozzle head portion is intermittently ejected to record characters and symbols on a surface of a recording medium; and a method in which an ink stored in a nozzle head portion is rapidly heated at a portion very close to an ejecting portion to generate bubbles and volume expansion owing to the bubbles permits the intermittent ejection of the ink to record characters and symbols on a surface of a recording medium. A yellow ink composition or an ink set according to a preferred embodiment of the invention is preferably used for an ink jet recording method using an electrostrictive element. Droplets of the ink composition are preferably ejected from a recording head that can eject ink droplets by the dynamic action of a piezoelectric element.

In a record provided by performing recording on a recording medium with a yellow ink composition or an ink set according to an embodiment of the invention, a satisfactory image having excellent lightfastness, water resistance, satisfactory vividness, and density is provided.

Various recording media may be used. Examples thereof include specialized ink-jet paper (e.g., matte paper and glossy paper), plain paper, paper for books, and films.

EXAMPLES

While the invention will be described in more detail by means of examples below, the invention is not limited to these examples.

Preparation of Self-Dispersible Yellow Pigment Dispersion

A 4-L stainless-steel beaker was placed on a rotor-stator type high shear mixer (Model L4RT-A, manufactured by Silverson Machines, Inc.) and immersed in an ice bath. About 75 g of C.I. Pigment Yellow 185 and 1,000 g of water were charged into the beaker. The mixture was mixed at 7,200 rpm for 15 minutes for homogenization. Then 20 mL of isopropyl alcohol solution containing 2.07 g (0.01 mol) of o-acetoanisidide was added thereto. The resulting mixture was stirred for another 15 minutes.

In another vessel, 4.35 g (0.025 mol) of sulfanilic acid, 30 mL of 1 N HCl, and 1.73 g (0.025 mol) of sodium nitrite were mixed at 5° C. to 10° C. to form a diazonium salt. The resulting diazonium salt was added to the mixture of C.I. Pigment Yellow 185 and o-acetoanisidide under stirring. The temperature was maintained at about 10° C. A 5 M sodium hydroxide solution was added dropwise to the resulting mixture to adjust the pH to 5 to 6. The reaction mixture was stirred for another 2 hours while the progress of the reaction was checked on the basis of the presence or absence of the diazonium salt. In the case where the diazonium salt was present, when a drop of each of the reaction mixture and 1 M $Na_2CO_3$ solution containing 0.1% aminosalicyl acid was placed on filter paper, spread portions of the two drops come into contact with each other to show orange.

The reaction mixture was transferred to a flow-type sonic treatment system (manufactured by Telsonic Ultrasonics) and sonicated for 2 hours to provide a yellow pigment dispersion. The resulting dispersion was purified through 50-nm diafiltration membrane column and then concentrated so as to have a solid content of 30%, resulting in a self-dispersible yellow pigment dispersion.

Also for C.I. Pigment Blue 15:3, C.I. Pigment Red 122, and C.I. Pigment Yellow 74, self-dispersible pigment dispersions were prepared as above.

Preparation of Ink Composition

The components were mixed according to compositions shown in Tables 1 and 2. The resulting mixtures were filtered with 10-μm membrane filter to prepare inks. The values shown in Tables 1 and 2 indicate contents (percent by weight) in the inks.

TABLE 1

| | Ink | Cyan ink composition C1 | Magenta ink composition M1 | Yellow ink composition Y1 | Yellow ink composition Y2 |
|---|---|---|---|---|---|
| Cyan pigment | C.I. PB 15:3 | 15 | — | — | — |
| Magenta pigment | C.I. PR 122 | — | 15 | — | — |
| Yellow pigment | C.I. PY 185 | — | — | 0 | 3 |
| | C.I. PY 74 | — | — | 15 | 12 |
| Ratio of C.I. PY 185 to C.I. PY 74 | | — | — | — | 0.25 |
| Glycerol | | 10 | 10 | 10 | 10 |
| Triethylene glycol | | 5 | 5 | 5 | 5 |
| 1.2-Hexanediol | | 2 | 2 | 2 | 2 |
| Trimethylolpropane triethylene glycol monobutyl ether | | 2 | 2 | 2 | 2 |
| Olfine E1010 | | 0.5 | 0.5 | 0.5 | 0.5 |
| Surfynol 104 | | 0.5 | 0.5 | 0.5 | 0.5 |
| Triethanolamine | | 1 | 1 | 1 | 1 |
| Deionized water | | Balance | Balance | Balance | Balance |

TABLE 2

| | | Yellow ink composition | | | | | |
|---|---|---|---|---|---|---|---|
| | Ink | Y3 | Y4 | Y5 | Y6 | Y7 | Y8 |
| Cyan pigment | C.I. PB 15:3 | — | — | — | — | — | — |
| Magenta pigment | C.I. PR 122 | — | — | — | — | — | — |

TABLE 2-continued

|  | Ink | Y3 | Y4 | Y5 | Y6 | Y7 | Y8 |
|---|---|---|---|---|---|---|---|
| Yellow pigment | C.I. PY 185 | 5 | 10 | 12 | 14 | 14.5 | 15 |
|  | C.I. PY 74 | 10 | 5 | 3 | 1 | 0.5 | 0 |
| Ratio of C.I. PY 185 to C.I. PY 74 |  | 0.5 | 2 | 4 | 14 | 29 | — |
| Glycerol |  | 10 | 10 | 10 | 10 | 10 | 10 |
| Triethylene glycol |  | 5 | 5 | 5 | 5 | 5 | 5 |
| 1.2-Hexanediol |  | 2 | 2 | 2 | 2 | 2 | 2 |
| Trimethylolpropane |  | 2 | 2 | 2 | 2 | 2 | 2 |
| triethylene glycol monobutyl ether |  | 2 | 2 | 2 | 2 | 2 | 2 |
| Olfine E1010 |  | 0.5 | 0.5 | 0.5 | 0.5 | 0.5 | 0.5 |
| Surfynol 104 |  | 0.5 | 0.5 | 0.5 | 0.5 | 0.5 | 0.5 |
| Triethanolamine |  | 1 | 1 | 1 | 1 | 1 | 1 |
| Deionized water |  | Balance | Balance | Balance | Balance | Balance | Balance |

Evaluation Method
Evaluation 1: Measurement of Optical Density

Solid areas were printed with the prepared yellow ink compositions using an ink jet printer PX-G900 (manufactured by Seiko Epson Corporation) adapted to perform single-pass printing at a resolution of 360 dpi×360 dpi. Printing was performed on a recording medium, Xerox 4200. The resulting samples were allowed to stand for 1 hour under normal environment. Then optical densities of the solid areas were measured with a Gretag densitometer (manufactured by Gretag Macbeth). Evaluation was made according to the evaluation criteria described below. Table 3 shows the results.
AA: an optical density of 1.3 or more
A: An optical density of 1.2 or more and less than 1.3.
B: An optical density of 1.1 or more and less than 1.2.
C: An optical density of 1.0 or more and less than 1.1.
D: An optical density of less than 1.0.
Evaluation 2: Lightfastness Printing was performed with the prepared yellow ink compositions in the same way as in Evaluation 1, except that the duty was adjusted in such a manner that the optical density was 1.0. The printed sheets were placed in the chamber of a fade meter (a fluorescent lamp fade meter, Suga Test Instruments Co., Ltd.) and allowed to stand at a temperature of 24° C. and humidity of 60% for 40 days. The colors of the printed sheets were measured. The residual rates of the optical densities of the solid images immediately after printing were calculated. Evaluation was made according to the evaluation criteria described below. The fluorescent lamp fade meter has 60 fluorescent lamps and can perform an exposure test at an illuminance on the printing surfaces of 70,000 lux. Table 3 shows the results.
A: 85% or more.
B: 70% or more and less than 85%.
C: Less than 70%.
Evaluation 3: Storage Stability Into a 100-g plastic bottle, 60 g each of the prepared yellow ink compositions were charged. The bottles were tightly sealed and then allowed to stand at 70° C. for a week. The viscosity of each ink composition before and after the standing was measured with a vibratory viscometer (manufactured by Yamaichi Electronics Co., Ltd.) to determine the rate of change in viscosity. The storage stability was evaluated according to the evaluation criteria described below. Table 3 shows the results.
A: A rate of change in viscosity of less than ±5%.
B: A rate of change in viscosity of ±5% or more and less than ±10%.
C: A rate of change in viscosity of ±10% or more.

Evaluation 4: Recoverability from Clogging

Printing was performed with the prepared ink compositions in the same way as in Evaluation 1 to make sure that the ink compositions were ejected from all nozzles of a head. The head was allowed to stand at 40° C. for a week under a state in which no ink cartridge was mounted and in which the head was located outside the home position (the head was displaced from a position where a cap was arranged on the printer, so that the head was not capped). Then the number of cleaning operations required to eject the ink compositions from all nozzles and achieve the print quality comparable to the initial print quality was measured. From the results, the recoverability from clogging was evaluated according to the evaluation criteria described below.
A: Print quality comparable to the initial print quality was achieved after 3 or less times of cleaning operations.
B: Print quality comparable to the initial print quality was achieved after 4 to 9 times of cleaning operations.
C: Print quality comparable to the initial print quality was not achieved after 10 or more times of cleaning operations.

TABLE 3

|  | Yellow ink composition | Optical density | Light-fastness | Storage stability | Recoverability from clogging |
|---|---|---|---|---|---|
| Example 1 | Y3 | AA | B | A | A |
| Example 2 | Y4 | AA | B | A | A |
| Example 3 | Y5 | AA | A | A | A |
| Example 4 | Y6 | AA | A | A | B |
| Comparative Example 1 | Y1 | AA | C | B | A |
| Comparative Example 2 | Y2 | AA | C | B | A |
| Comparative Example 3 | Y7 | A | A | A | C |
| Comparative Example 4 | Y8 | A | A | A | C |

Evaluation 5: Color Reproducibility

Ink sets including combinations of prepared ink compositions shown in Table 4 were constituted. For each ink set, a specialized print pattern having 400 patches was printed as in Evaluation 1. Colors of all patches of the resulting prints were measured. The GumatVolume in an L*a*b* three-dimensional space was calculated with a computational tool. The calculated GumatVolume was dimensionless. The color reproducibility was evaluated by the calculated GumatVolume values and determined according to the evaluation criteria described below. Table 4 shows the results.
A: 240,000 or more.
B: 200,000 or more and less than 240,000.
C: 140,000 or more and less than 200,000.
D: 140,000 or less.

Evaluation 6: Lightfastness of Ink Set

A grey pattern having an optical density of 1.0 was printed under the same conditions as in Evaluation 1 with each ink set including three color ink compositions: yellow, magenta, and cyan. The printed sheets were subjected to the exposure test in the same way as in Evaluation 2. The colors of the printed sheets were measured. The color difference ΔE*ab before and after the test was determined using expression (1). From the results, the lightfastness was evaluated according to the evaluation criteria described below. Table 4 shows the results.

$$\Delta E^*ab = [(\Delta L^*)^2 + (\Delta a^*)^2 + (\Delta b^*)^2]^{1/2} \quad (1)$$

A: The color difference ΔE* was less than 20.
B: The color difference ΔE* was 20 or more and less than 30.
C: The color difference ΔE* was 30 or more.

Evaluation 7: Measurement of Optical Density in Red Portion and Green Portion

Among 400 patches printed as in Evaluation 5, optical densities of red patch portions and green patch portions were measured with a Gretag densitometer (manufactured by Gretag Macbeth). The average optical density of the two colors was evaluated according to the evaluation criteria described below. Table 4 shows the results.

A: The optical density was 1.3 or more.
B: The optical density was 1.2 or more and less than 1.3.
C: The optical density was less than 1.2.

TABLE 4

|  | Ink set | Cyan ink composition | Magenta ink composition | Yellow ink composition | Color reproducibility | Lightfastness of ink set | Average optical density of red portion and green portion |
|---|---|---|---|---|---|---|---|
| Example 5 | Ink set 1 | C1 | M1 | Y3 | A | B | A |
| Example 6 | Ink set 2 | C1 | M1 | Y4 | A | A | A |
| Example 7 | Ink set 3 | C1 | M1 | Y5 | A | A | A |
| Example 8 | Ink set 4 | C1 | M1 | Y6 | A | A | B |
| Comparative Example 5 | Ink set 5 | C1 | M1 | Y1 | A | C | A |
| Comparative Example 6 | Ink set 6 | C1 | M1 | Y2 | A | C | A |
| Comparative Example 7 | Ink set 7 | C1 | M1 | Y7 | A | A | C |
| Comparative Example 8 | Ink set 8 | C1 | M1 | Y8 | A | A | C |

What is claimed is:

1. A yellow ink composition comprising:
C.I. Pigment Yellow 185 and C.I. Pigment Yellow 74 as coloring agents,
wherein the ratio of a C.I. Pigment Yellow 185 content (percent by weight) to a C.I. Pigment Yellow 74 content (percent by weight) is in the range of 0.5 to 15, and
wherein the yellow ink composition has a pigment content of 10% to 20% by weight.

2. The ink composition according to claim 1, further comprising:
water;
a water-soluble organic compound;
a pH adjuster; and
a nonionic surfactant.

3. The ink composition according to claim 2, wherein the water-soluble organic compound contains a polyhydric alcohol, a solid humectant, and butyl ether of glycol.

4. The ink composition according to claim 2, wherein the pH adjuster is composed of alkali hydroxide and/or trialkanolamine.

5. The ink composition according to claim 2, wherein the nonionic surfactant is an acetylenic glycol surfactant and/or a modified polysiloxane surfactant.

6. An ink jet recording method comprising:
ejecting droplets of the ink composition according to claim 1; and
depositing the droplets onto a recording medium to perform printing.

7. An ink set for use in ink jet recording, comprising:
a cyan ink composition;
a magenta ink composition; and
a yellow ink composition,
wherein the cyan ink composition contains at least one pigment selected from the group consisting of C.I. Pigment Blue 15:3 and C.I. Pigment Blue 15:4 as a coloring agent,
the magenta ink composition contains at least one pigment selected from the group consisting of C.I. Pigment Red 122, C.I. Pigment Red 202, C.I. Pigment Red 209, and C.I. Pigment Violet 19 as a coloring agent, and
the yellow ink composition is the yellow ink composition according to claim 1, and
wherein each of the ink compositions has a pigment content of 10% to 20% by weight.

8. The ink set according to claim 7, wherein each of the ink compositions contains water, a water-soluble organic compound, a pH adjuster, and a nonionic surfactant.

9. The ink set according to claim 8, wherein the water-soluble organic compound contains a polyhydric alcohol, a solid humectant, and butyl ether of glycol.

10. The ink set according to claim 8, wherein the pH adjuster is composed of alkali hydroxide and/or trialkanolamine.

11. The ink set according to claim 8, wherein the nonionic surfactant is an acetylenic glycol surfactant and/or a modified polysiloxane surfactant.

12. An ink jet recording method comprising:
ejecting droplets of ink from the ink set according to claim 7; and
depositing the droplets onto a recording medium to perform printing.

13. The ink jet recording method according to claim 6, wherein the printing is performed by recording one dot line in one main scan operation.

14. The ink composition according to claim 1, wherein the yellow ink composition has a C.I. Pigment Yellow 185 content of 5% to 14% by weight and a C.I. Pigment Yellow 74 content of 1% to 10% by weight.

* * * * *